(12) United States Patent
Wang et al.

(10) Patent No.: US 11,144,091 B2
(45) Date of Patent: Oct. 12, 2021

(54) POWER SAVE MODE FOR WEARABLE DEVICE

(71) Applicant: Lenovo (Singapore) Pte. Ltd., Singapore (SG)

(72) Inventors: Song Wang, Cary, NC (US); Mengnan Wang, Chapel Hill, NC (US); Hong Xiong, Raleigh, NC (US); Zhenyu Yang, Dayton, OH (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/658,720

(22) Filed: Oct. 21, 2019

(65) Prior Publication Data

US 2021/0116960 A1 Apr. 22, 2021

(51) Int. Cl.
*G06F 3/01* (2006.01)
*G06F 1/16* (2006.01)
*G06K 19/077* (2006.01)
*G02B 27/01* (2006.01)
*G06T 19/00* (2011.01)

(52) U.S. Cl.
CPC ........... *G06F 1/163* (2013.01); *G02B 27/017* (2013.01); *G06F 3/011* (2013.01); *G06F 3/017* (2013.01); *G06K 19/07762* (2013.01); *G06T 19/006* (2013.01)

(58) Field of Classification Search
CPC .......... G06F 1/163; G06F 3/011; G06F 3/017; G02B 27/017; G06K 19/07762; G06T 19/006
See application file for complete search history.

(56) References Cited

U.S. PATENT DOCUMENTS

| | | | | |
|---|---|---|---|---|
| 2013/0278631 | A1* | 10/2013 | Border | G06F 3/04842 345/633 |
| 2014/0180455 | A1* | 6/2014 | Weast | A61B 5/6824 700/91 |
| 2017/0072285 | A1* | 3/2017 | Weast | A63B 24/0059 |
| 2017/0324437 | A1* | 11/2017 | Ruttler | A61B 5/02438 |

* cited by examiner

*Primary Examiner* — Robert J Michaud (74) *Attorney, Agent, or Firm* — Ference & Associates LLC (57) ABSTRACT

One embodiment provides a method, including: identifying, using one or more sensors, an orientation of a wearable device; determining, using a processor, whether the orientation corresponds to an inactive orientation; and providing, responsive to determining that the orientation corresponds to the inactive orientation, a power off notification to a user of the wearable device. A method, including: detecting, using an audio capture device operatively coupled to a wearable device, environmental audio, wherein the wearable device is an augmented reality device; identifying, using a processor, augmented reality contents presented on a display of the wearable device; determining, using a processor, whether the environmental audio and the augmented reality contents correspond to a similar context; and presenting, responsive to determining that the environmental audio and the augmented reality contents do not correspond to the similar context, a power save option to a user. Other aspects are described and claimed.

20 Claims, 5 Drawing Sheets

POWER SAVE MODE FOR WEARABLE DEVICE

BACKGROUND

As technology has progressed, augmented reality ("AR") and/or virtual reality ("VR") technology has become prevalent in a variety of different types of information handling devices ("devices"), for example, smart phones, tablets, wearable devices (e.g., head mounted devices such as AR/VR glasses or headsets, etc.), and the like. Common applications for this technology include gaming, information presentation, application interaction, enhanced object visualization, etc.

BRIEF SUMMARY

In summary, one aspect provides a method, comprising: identifying, using one or more sensors, an orientation of a wearable device; determining, using a processor, whether the orientation corresponds to an inactive orientation; and providing, responsive to determining that the orientation corresponds to the inactive orientation, a power off notification to a user of the wearable device.

Another aspect provides a wearable device, comprising: one or more sensors; a processor; a memory device that stores instructions executable by the processor to: identify an orientation of the wearable device; determine whether the orientation corresponds to an inactive orientation; and provide, responsive to determining that the orientation corresponds to the inactive orientation, a power off notification to a user of the wearable device.

A further aspect provides a method, comprising: detecting, using an audio capture device operatively coupled to a wearable device, environmental audio, wherein the wearable device is an augmented reality device; identifying, using a processor, augmented reality contents presented on a display of the wearable device; determining, using a processor, whether the environmental audio and the augmented reality contents correspond to a similar context; and presenting, responsive to determining that the environmental audio and the augmented reality contents do not correspond to the similar context, a power save option to a user.

A further aspect provides a wearable device, comprising: an audio capture device; a display; a processor; wherein the wearable device is an augmented reality device; a memory device that stores instructions executable by the processor to: detect environmental audio; identify augmented reality contents presented on the display of the wearable device; determine whether the environmental audio and the augmented reality contents correspond to a similar context; and present, responsive to determining that the environmental audio and the augmented reality contents do not correspond to the similar content, a power save option to a user The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional AR/VR wearable devices generally have a shorter battery life than other mobile devices (e.g., phones, tablets, laptops, etc.) due in part to certain design limitations that consider weight and comfortability. Additionally, the processing demands for AR/VR applications are greater than for many conventional mobile device applications, which further contribute to the increased power consumption rates for wearable devices that employ AR/VR technology. Furthermore, these wearable devices continue to consume power even when the device is not actively in use (e.g., when the wearable device is positioned on top of a user's head, when the wearable device is hanging from a user's shirt or is positioned in a user's pocket, etc.).

Solutions exist for conserving battery life in the foregoing types of wearable devices. For example, one solution utilizes gaze detection to determine whether a user is looking at objects on a display, or a portion of the display, of a wearable device. When no gaze is detected, the system may dynamically place the wearable device into sleep mode. However, situations may arise where the wearable device may go to sleep against the desires of the user (e.g., where the user has removed the wearable device for a brief moment, when the user has closed their eyes briefly, etc.). In another example, a user may actuate a power button to turn the wearable device on or off. However, such a solution requires manual interaction by the user, which may be burdensome, especially in situations where the user may need to frequently cycle the wearable device between an on and off state in a short period of time.

Accordingly, embodiments are provided that dynamically place devices into sleep or power off mode depending on their physical orientation and/or based on contextual environment information. In an embodiment, an orientation of a wearable device may be identified. An embodiment may then determine whether the orientation corresponds to an active or an inactive orientation. An active orientation may correspond to a commonly known wearing position of the device whereas an inactive orientation may correspond to a commonly known idle position of the device. Responsive to determining that the orientation corresponds to an inactive orientation, an embodiment may provide a notification to a user informing them that the device will be powered off in a short period of time. Additional embodiments may utilize gaze tracking technology to determine whether a user's gaze is focused on a display of the device. Such an embodiment may be used in combination with the aforementioned orientation determination step in an effort to more accurately determine when a wearable device is not in use and may be placed in an power off mode.

In another embodiment, environmental audio (e.g., conversational audio directed toward the user from another individual, etc.) may be detected by the wearable device. The wearable device in such an embodiment may be an AR/VR device (i.e., a device capable of displaying AR/VR content). An embodiment may then identify AR or VR contents presented on a display of the wearable device. Thereafter, an embodiment may determine whether the environmental audio and the AR/VR contents correspond to the same context (i.e., topic). Responsive to determining that the two data points do not correspond to the same or similar context, an embodiment may provide a power save option to a user (e.g., an AR option provided on a display of the device, etc.). Such an embodiment may allow a user to suspend the AR/VR visuals in order to address the environmental audio.

The illustrated example embodiments will be best understood by reference to the figures. The following description is intended only by way of example, and simply illustrates certain example embodiments.

Figure 1:
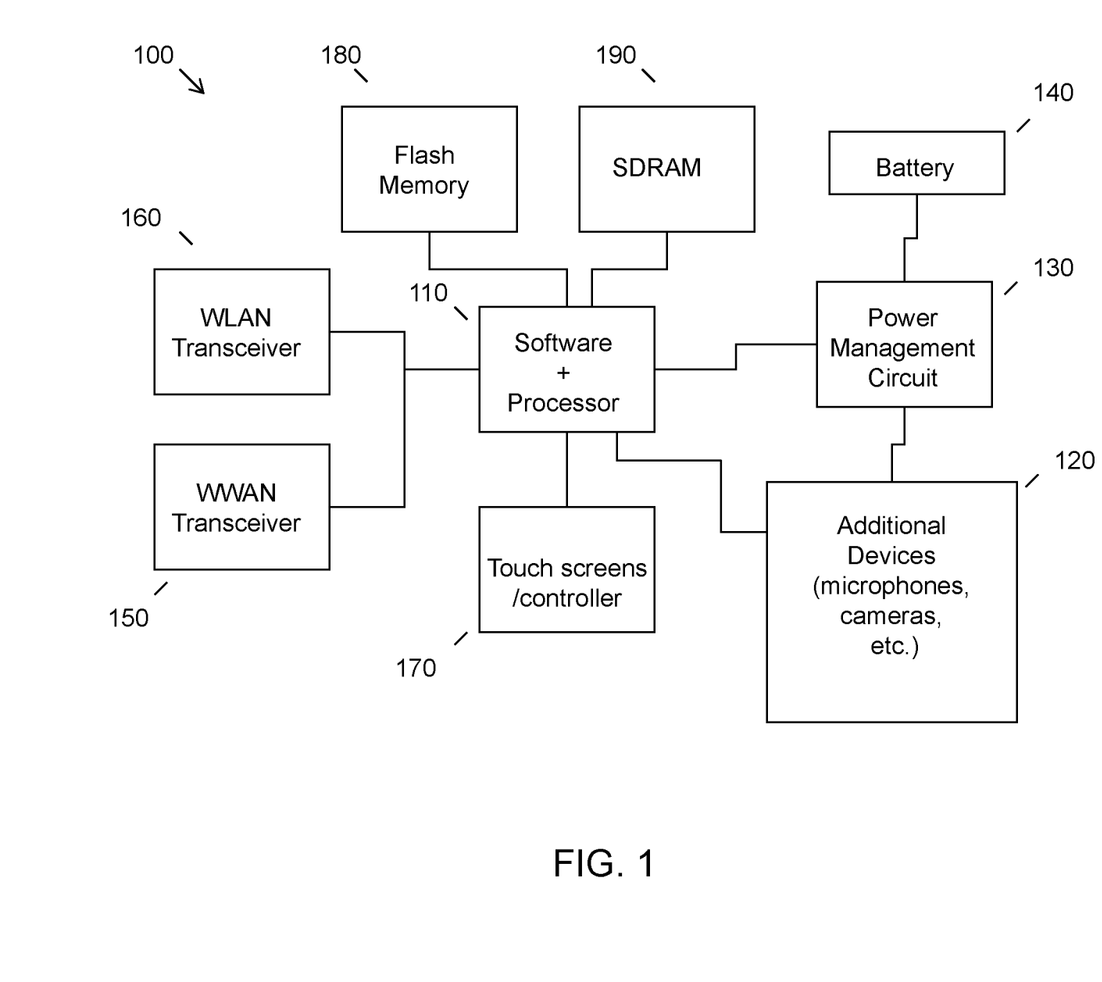
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
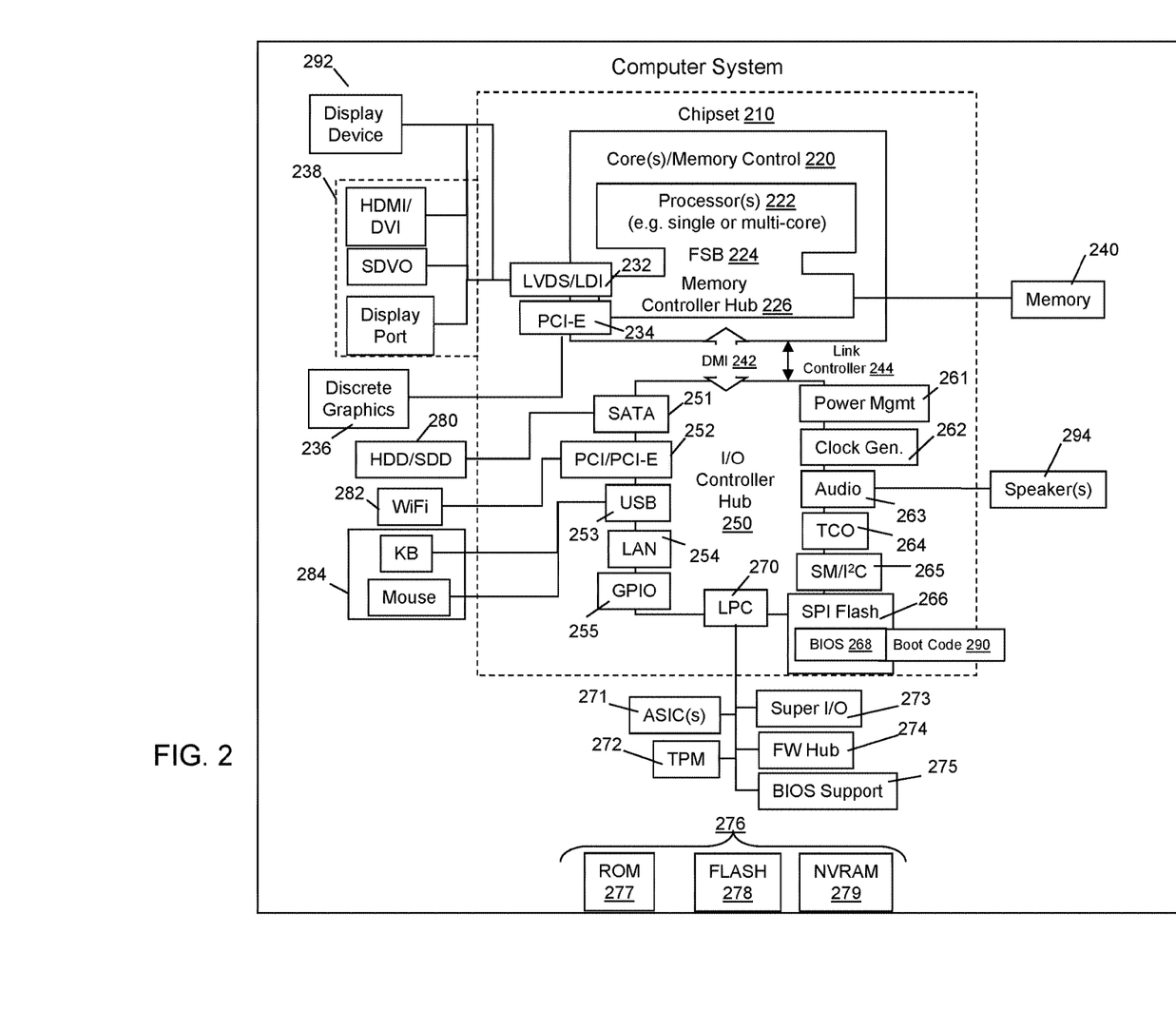
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices having augmented reality capabilities and having at least one display. For example, the circuitry outlined in FIG. 1 may be implemented in an augmented reality headset embodiment, whereas the circuitry outlined in FIG. 2 may be implemented in a smart phone.

Figure 3:
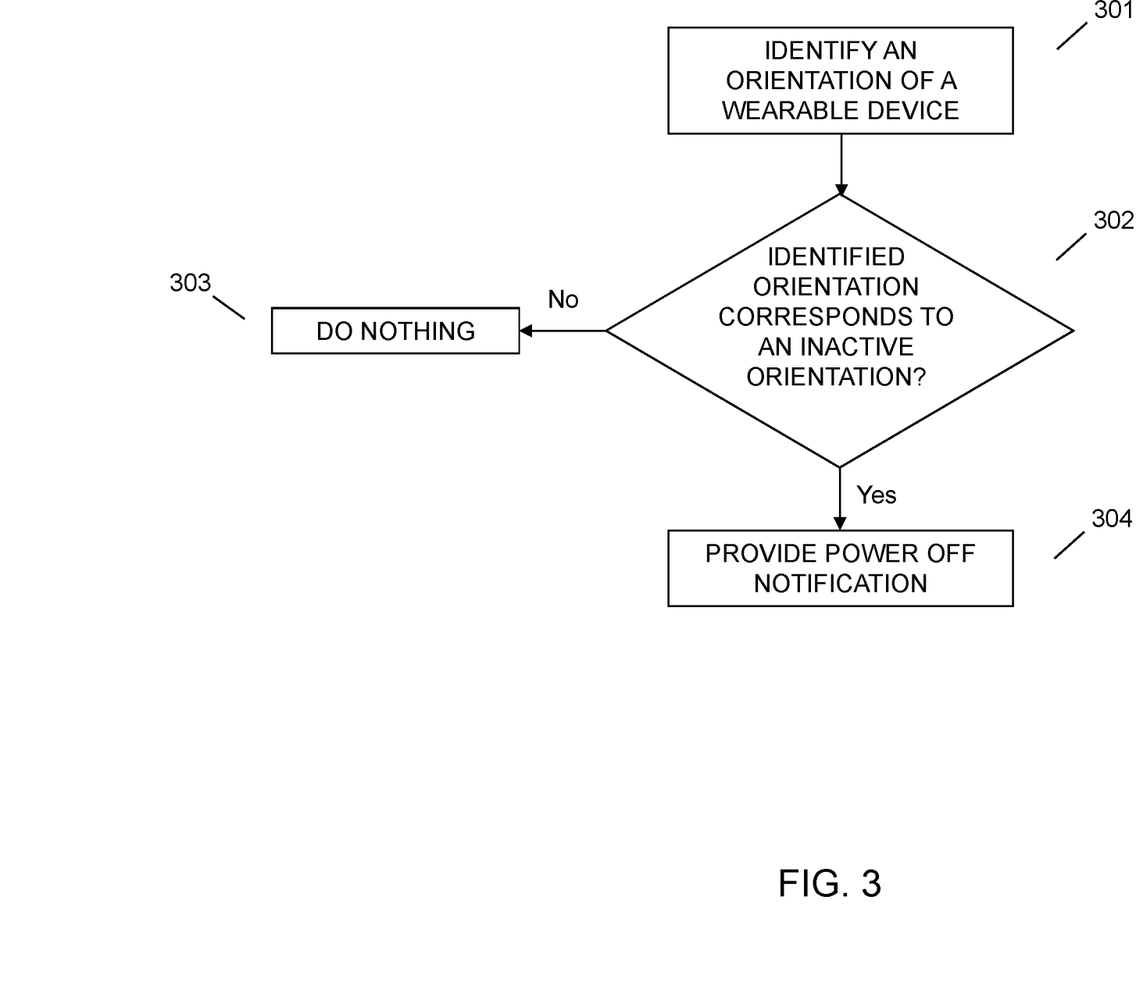
FIG. 3 illustrates an example method of providing a power off notification to a user of a wearable device.

Referring now to FIG. 3, an embodiment may dynamically adjust a power mode of a device based upon the device's determined orientation. At 301, an embodiment may identify an orientation of a wearable device. In an embodiment, the wearable device may be virtually any device but for simplicity purposes the remaining disclosure will be described with reference to a wearable device ("device") having AR and/or VR capabilities (e.g., smart glasses, another type of wearable headset, etc.). In an embodiment, the identification may be facilitated via the use of one or more sensors integrally or operatively coupled to the device (e.g., camera sensors, gyroscopes, etc.).

At 302, an embodiment may determine whether the orientation of the device corresponds to an active orientation or an inactive orientation. An active orientation may correspond to a worn position of the device (e.g., positioned on the user's head over the user's eyes, etc.). Conversely, an inactive orientation may correspond to an idle position of the device (e.g., tilted on top of the user's head, hanging from a user's shirt, placed in a user's pocket or on another surface, etc.).

The determination may be facilitated by first comparing the identified orientation to an accessible database (e.g., stored locally on the device or remotely on another device or server, etc.) comprising a list of known active and/or inactive orientations of the wearable device. An embodiment may then determine whether the identified orientation shares a predetermined level of similarity (e.g., 80% similarity, 90% similarity, etc.) with a known orientation in the list. Responsive to determining that such a level of similarity is identified with one of the known orientations, an embodiment may associate the designation corresponding to the similar known orientation with the current, identified orientation.

Responsive to determining, at 302, that the device corresponds to an active orientation, an embodiment may, at 303, take no additional action. Conversely, responsive to determining, at 302, that the device corresponds to an inactive orientation, an embodiment may, at 304, provide a power off notification to a user. The notification may serve to notify a user that the device was determined to be in an inactive orientation and will be powered off soon.

In an embodiment, the power off notification may be virtually any type of notification (e.g., visual notification, audible notification, haptic notification, a combination thereof, etc.) provided by any corresponding output device (e.g., a display screen, a speaker, using one or more actuators, etc.) integrally or operatively coupled to the device. In an embodiment, the type of notification provided to the user may depend on the detected orientation and/or positioning of the device. For example, if the device was determined to be in an orientation that was not visible to the user (e.g., in the user's pocket, etc.) or was determined to be a predetermined distance away from the user (e.g., on a table several feet away from the user, etc.) then an embodiment may provide an audible notification. As another example, if the device was determined to be in an orientation that was close to the user's person (e.g., hanging from a user's shirt, etc.) an embodiment may provide a haptic notification. In another embodiment, available context data may also be utilized to determine the appropriate output method. For example, if an embodiment determines that a user is utilizing their device at work (e.g., by receiving an indication from GPS data, calendar data, etc.), an embodiment may choose to use a more subtle output notification technique (e.g., a haptic notification, etc.).

In an embodiment, the device may power off (e.g., turn off, enter a sleep mode, etc.) after a predetermined period of time has elapsed subsequent to provision of the power off notification (e.g., 30 seconds, 1 minute, etc.). After the requisite period of time has elapsed, an embodiment may automatically power off the device. Alternatively, the device may power off responsive to determining that user input has not been received within a predetermined period of time after provision of the aforementioned power off notification. In the context of this application, the user input may be at least one of: an explicit selection input (e.g., pressing or selecting a button on the device or on a display screen of the device, moving the device, etc.) or a re-orientation of the device to a known active orientation (e.g., a user taking the glasses out of his pocket and putting them on his head, etc.). In an embodiment, the power off notification may comprise an indication designating how long a user has to provide input until the device will power off. For example, an embodiment may provide an audible notification that informs the user that the device will power off in 30 seconds if user input is not received.

Figure 4:
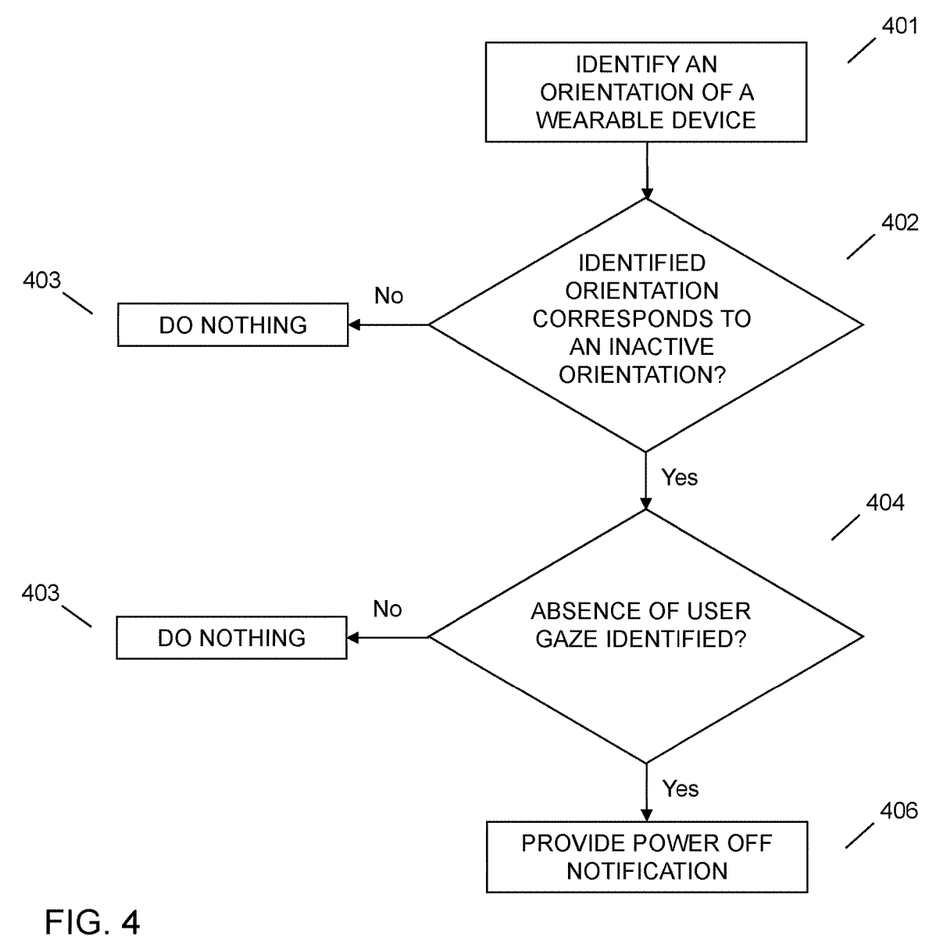
FIG. 4 illustrates another example method of providing a power off notification to a user of a wearable device.

Referring now to FIG. 4, an embodiment may utilize gaze tracking in combination with some or all of the aforementioned embodiments in an attempt to determine whether to place the device into a power off state. At 401, an embodiment may identify an orientation of the device as previously described with respect to step 301. At 402, an embodiment may determine whether the orientation corresponds to an inactive orientation as previously described with respect to step 302. At 404, an embodiment may identify an absence of user gaze (e.g., using one or more camera sensors, etc.). For example, an embodiment may determine that user gaze has not been detected by the device for a predetermined period of time (e.g., 30 seconds, 1 minute, etc.). Responsive to determining that the orientation of the device corresponds to an inactive orientation and that an absence of user gaze has been detected, an embodiment may provide, at 406, the power off notification as previously described with respect to step 304.

Figure 5:
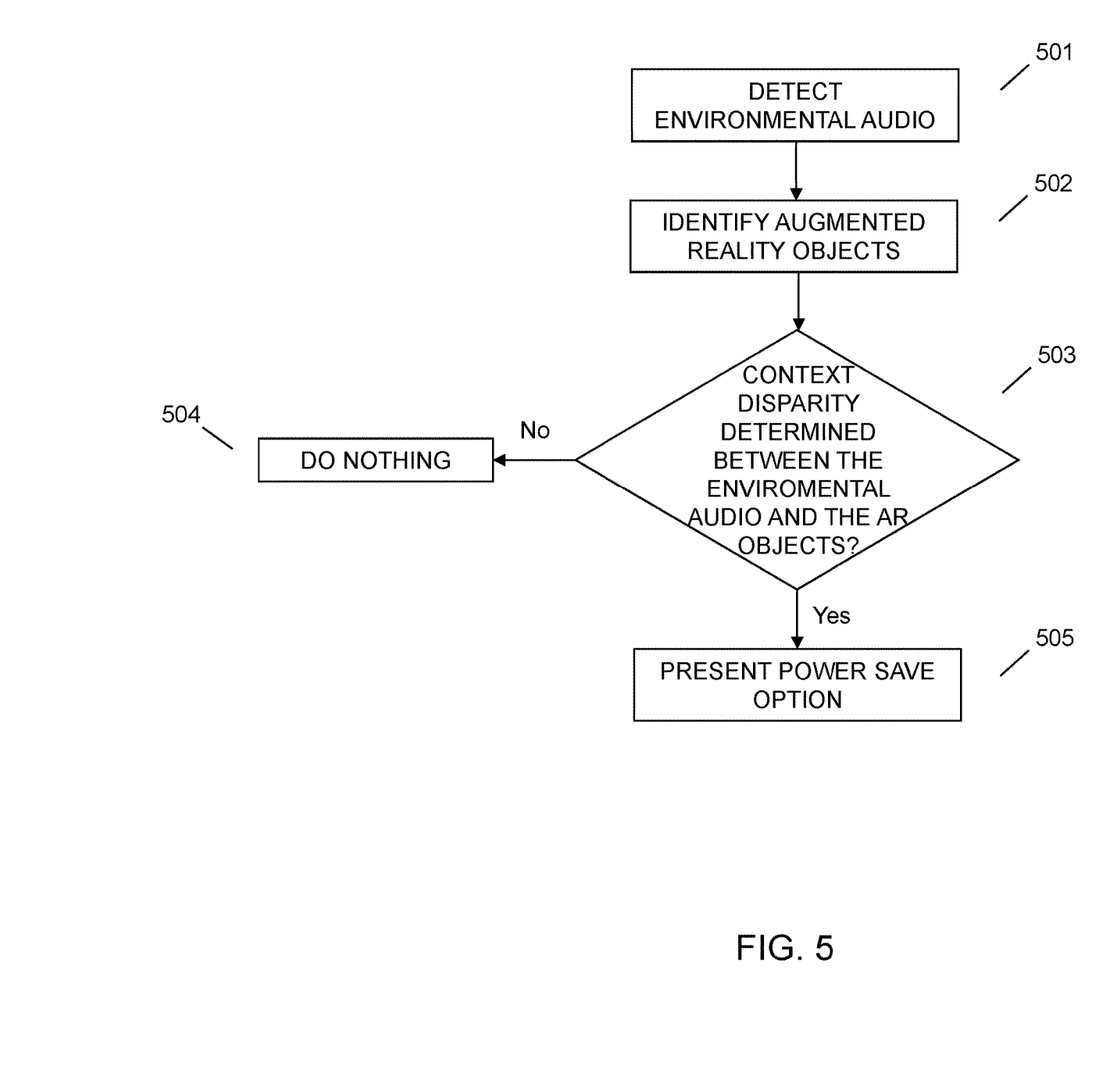
FIG. 5 illustrates an example method of presenting a power option to a user of a wearable device.

Referring now to FIG. 5, an embodiment may dynamically provide a power save option to a user based upon a context comparison between detected environmental audio and AR/VR contents displayed on a user's device. At 501, an embodiment may detect environmental in a proximate area around the device. The environmental audio may be detected by using one or more audio capture devices (e.g., microphones, etc.) integrally coupled to the device or positioned away from the device but in communication with the device (e.g., using a wireless communication technique, etc.).

In an embodiment, the environmental audio may correspond to conversational audio directed toward a user of the device by another individual. For example, another individual may approach a user and initiate a conversation with them while the user is visualizing AR or VR contents on their device. Additionally or alternatively, the environmental audio may correspond to other dialogue that originates from another noise source (e.g., songs emitted from a radio, dialogue produced by characters on a television show or commercial, etc.).

At 502, an embodiment may identify that augmented or virtual reality objects are presented on a display of the device. In this sense, an embodiment may not only identify that AR or VR objects are being displayed on the device, but may also identify the contextual nature of these objects (e.g., by identifying metadata associated with the objects, by utilizing one or more conventional image analysis techniques, etc.). For example, an embodiment may identify that an augmented document is being projected on the display of the device and that the augmented document corresponds to a work-based document. As another example, an embodiment may identify that a particular gaming application is currently active and that augmented characters associated with the gaming application are being projected on the display of the device.

At 503, an embodiment may determine whether the environmental audio and the AR or VR content correspond to the same or similar context. More particularly, an embodiment may determine whether the two sets of data are related to the same or substantially similar topic (e.g., the same work task, the same game or gaming application, etc.). This determination may be facilitated by utilizing one or more conventional natural language understanding ("NLU") techniques and/or one or more conventional image analysis techniques.

Responsive to determining, at 503, that the two data points correspond to the same or substantially similar context, an embodiment may, at 504, take no additional action. Conversely, responsive to determining, at 503, that the two data points do not correspond to the same or substantially similar context, an embodiment may, at 505, present a power save option to a user. In an embodiment, the power save option may be presented using virtually any type of notification technique. For simplicity purposes, the notification technique used to describe the power save option for the remainder of this application corresponds to a visual notification in which the power save option is an augmented image projected onto a display of the device.

In an embodiment, the power save option may be virtually any type of visual notification (e.g., a message, an image, an icon, a combination of one or more of the foregoing, etc.). In an embodiment, the power save option may correspond to a message that prompts the user to place their device into a power save mode. Additionally or alternatively, once the power save option is presented, an embodiment may monitor for a user input selection (e.g., a gaze selection, a gesture selection, a verbal selection, etc.) directed toward the power save option. Such a user input selection may direct the device to enter a power save mode. For example, responsive to detecting that another individual has started speaking to the user about topics that are unrelated to the augmented objects currently displayed on a user's device, an embodiment may display an augmented power save option icon on a periphery of the display of the device. Responsive to detecting that a user has gazed at the icon for a predetermined period of time (e.g., 3 seconds, etc.), an embodiment may thereafter power off the device in order to allow the user to engage in the conversation without being visually encumbered by one or more augmented objects.

The various embodiments described herein thus represent technical improvements to conventional methods for powering off a device. Using the techniques described herein, one embodiment may identify an orientation of a device and determine whether that orientation corresponds to an inactive orientation. Responsive to determining that the orientation does correspond to an inactive orientation, an embodiment may provide a notification to a user that the device will be placed into a power off mode within a predetermined period of time. In another embodiment, environmental audio in proximity to a user may be detected and AR or VR objects presented on a display of a user's device may be identified. An embodiment may thereafter determine whether the environmental audio and the displayed objects share the same or similar context. Responsive to determining that the two data sets do not share the same context, an embodiment may present a power save option to a user. The foregoing embodiments As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, using one or more sensors, an orientation of a wearable device, wherein the wearable device is at least one of: an augmented reality device and a virtual reality device;
   determining, using a processor, whether the orientation corresponds to an inactive orientation or an active orientation, wherein display lens of a wearable device in the inactive orientation are positioned away from a user's eyes and wherein the determining comprises:
      accessing a database comprising a list of inactive orientations of the wearable device; and
      determining whether a predetermined level of similarity exists between the identified orientation of the wearable device and a known inactive orientation stored in the list of inactive orientations for the wearable device;
   identifying, using the one or more sensors, an absence of user gaze on the display lens of the wearable device for a predetermined period of time; and
   providing, responsive to determining that the orientation corresponds to the inactive orientation and that the absence of user gaze on the display lens has been identified for the predetermined period of time, a power off notification to a user of the wearable device;
   wherein a type of the power off notification is influenced by the orientation of the wearable device;
   wherein the power off notification comprises an indication of a time until a power off event occurs and a suggestion to avoid the power off event by reorienting the wearable device to the active orientation.

2. The method of claim 1, wherein the determining comprises comparing the orientation to a database comprising a list of inactive orientations of the wearable device.

3. The method of claim 1, wherein the power off notification comprises a notification selected from the group consisting of an audible notification, a visual notification, and a haptic notification.

4. The method of claim 1, further comprising powering off the wearable device after a predetermined period of time has elapsed subsequent to provision of the power off notification.

5. The method of claim 1, further comprising:
   determining, using a processor, whether a user input responsive to the power off notification was provided within a predetermined period of time; and
   powering off the wearable device responsive to determining that the user input was not received within the predetermined period of time.

6. The method of claim 1, further comprising:
   identifying, using the one or more sensors, an absence of user gaze; and
   wherein the providing comprises providing the power off notification responsive to both: identifying the absence of user gaze and determining that the orientation corresponds to the inactive orientation.

7. The method of claim 1, wherein the wearable device is at least one of: an augmented reality device and a virtual reality device.

8. A wearable device, comprising:
   one or more sensors;
   a processor;
   a memory device that stores instructions executable by the processor to:
   identify an orientation of the wearable device, wherein the wearable device is at least one of: an augmented reality device and a virtual reality device;
   determine whether the orientation corresponds to an inactive orientation or an active orientation, wherein display lens of a wearable device in the inactive orientation are positioned away from a user's eyes and wherein the instructions executable by the processor to determine comprise instructions executable by the processor to:
      access a database comprising a list of inactive orientations of the wearable device; and
      determine whether a predetermined level of similarity exists between the identified orientation of the wearable device and a known inactive orientation stored in the list of inactive orientations for the wearable device;
   identify, using the one or more sensors, an absence of user gaze on the display lens of the wearable device for a predetermined period of time; and
   provide, responsive to determining that the orientation corresponds to the inactive orientation and that the absence of user gaze on the display lens has been identified for the predetermined period of time, a power off notification to a user of the wearable device;
   wherein a type of the power off notification is influenced by orientation of the wearable device;
   wherein the power off notification comprises an indication of a time until a power off event occurs and a suggestion to avoid the power off event by reorienting the wearable device to the active orientation.

9. The wearable device of claim 8, wherein the instructions executable by the processor to determine comprise instructions executable by the processor to compare the identified orientation to a database comprising a list of inactive orientations of the wearable device.

10. The wearable device of claim 8, wherein the power off notification comprises a notification selected from the group consisting of an audible notification, a visual notification, and a haptic notification.

11. The wearable device of claim 8, wherein the instructions are further executable by the processor to power off the wearable device after a predetermined period of time has elapsed subsequent to provision of the power off notification.

12. The wearable device of claim 8, wherein the instructions are further executable by the processor to:
determine whether a user input responsive to the power off notification was provided within a predetermined period of time; and
power off the wearable device responsive to determining that the user input was not received within the predetermined period of time.

13. The wearable device of claim 8, wherein the instructions are further executable by the processor to:
identify an absence of user gaze; and
wherein the instructions executable by the processor to provide comprise instructions executable by the processor to provide the power off notification responsive to both: identifying the absence of user gaze and determining that the orientation corresponds to the inactive orientation.

14. The wearable device of claim 8, wherein the wearable device is at least one of: an augmented reality device and a virtual reality device.

15. A method, comprising:
detecting, using an audio capture device operatively coupled to a wearable device, environmental audio, wherein the wearable device is an augmented reality device;
identifying, using a processor, augmented reality contents presented on a display of the wearable device;
determining, using a processor, whether a topic associated with the environmental audio and a topic associated with the augmented reality contents correspond to a similar context; and
presenting, responsive to determining that the topic associated with the environmental audio and the topic associated with the augmented reality contents do not correspond to the similar context, a power save option to a user.

16. The method of claim 15, wherein the environmental audio corresponds to conversational audio provided by another individual.

17. The method of claim 15, further comprising:
detecting a user input selection directed toward the power save option; and
initiating, responsive to the detecting, a power save mode for wearable device.

18. A wearable device, comprising:
an audio capture device;
a display;
a processor;
wherein the wearable device is an augmented reality device;
a memory device that stores instructions executable by the processor to:
detect environmental audio;
identify augmented reality contents presented on the display of the wearable device;
determine whether a topic associated with the environmental audio and a topic associated with the augmented reality contents correspond to a similar context; and
present, responsive to determining that the topic associated with environmental audio and the topic associated with augmented reality contents do not correspond to the similar content, a power save option to a user.

19. The wearable device of claim 18, wherein the environmental audio corresponds to conversational audio provided by another individual.

20. The wearable device of claim 18, wherein the instructions are further executable by the processor to:
detect a user input selection directed toward the power save option; and
initiate, responsive to the detecting, a power save mode for wearable device;
wherein the user input selection is a selection selected from the group consisting of: a gaze selection, a gesture selection, and a verbal selection.

* * * * *